United States Patent
Lee et al.

(10) Patent No.: US 10,618,426 B2
(45) Date of Patent: Apr. 14, 2020

(54) METHOD AND SYSTEM FOR CONTROLLING VEHICLE DURING CHARGING

(71) Applicants: Hyundai Motor Company, Seoul (KR); Kia Motors Corporation, Seoul (KR)

(72) Inventors: Ho Joong Lee, Gyeonggi-do (KR); Han Shin Youn, Seoul (KR); Jee Heon Kim, Gyeonggi-do (KR); Dong Jun Lee, Gyeonggi-do (KR); Hye Seung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 16/003,477

(22) Filed: Jun. 8, 2018

(65) Prior Publication Data

US 2019/0184838 A1 Jun. 20, 2019

(30) Foreign Application Priority Data

Dec. 20, 2017 (KR) .................. 10-2017-0176290

(51) Int. Cl.
*B60H 1/00* (2006.01)
*B60L 53/24* (2019.01)
*B60L 1/02* (2006.01)
*B60L 58/12* (2019.01)

(52) U.S. Cl.
CPC .......... *B60L 53/24* (2019.02); *B60H 1/00385* (2013.01); *B60H 1/00392* (2013.01); *B60H 1/00428* (2013.01); *B60H 1/00735* (2013.01); *B60H 1/00778* (2013.01); *B60L 1/02* (2013.01); *B60L 58/12* (2019.02); *B60L 2210/30* (2013.01); *B60L 2240/54* (2013.01)

(58) Field of Classification Search
CPC .. B60L 53/24; B60L 58/12; B60L 1/02; B60L 2210/30; B60L 2240/54; B60H 1/00385; B60H 1/00392; B60H 1/00428; B60H 1/00735; B60H 1/00778; B60H 1/00
See application file for complete search history.

(56) References Cited

FOREIGN PATENT DOCUMENTS

KR 20140114175 A 9/2014
KR 20160013551 A 2/2016

*Primary Examiner* — Robert L Deberadinis
(74) *Attorney, Agent, or Firm* — Mintz Levin Cohn Ferris Glovsky and Popeo, P.C.; Peter F. Corless (57) ABSTRACT

A method of controlling a vehicle during charging is applied to the vehicle that includes a charger converting external alternating current power into direct current power, and a first battery and an electric load connected to a terminal to which the direct current power converted and output by the charger. The method includes calculating a maximum outputtable power capable of being output by the charger when an operation of the charger is initiated; and calculating a maximum allowable load power capable of being applied to drive the electric load on the basis of the maximum outputtable power, a minimum charging power required to charge the first battery, and a minimum load-requesting power required to operate the electric load.

20 Claims, 4 Drawing Sheets

METHOD AND SYSTEM FOR CONTROLLING VEHICLE DURING CHARGING

CROSS REFERENCE TO RELATED APPLICATION

The present application claims under 35 U.S.C. § 119(a) the benefit of Korean Patent Application No. 10-2017-0176290, filed Dec. 20, 2017, the entire contents of which are incorporated by reference herein.

BACKGROUND

(a) Technical Field

The present disclosure generally relates to a method and a system for controlling a vehicle during charging, and more particularly, to a method and a system for controlling the vehicle during charging that can address problems of a charging time that is excessively long or a battery that is not charged due to a shortage of charging power provided from an on-board charger to the battery caused by power consumption of an electric load during slow charging.

(b) Description of the Related Art

To address problems such as global warming and environmental pollution, research and development of environmentally friendly vehicles has advanced in the automobile industry, and a market for such vehicles has expanded gradually.

Types of eco-friendly vehicles include electric vehicles, hybrid vehicles, and plug-in hybrid vehicles that include electric motors generating driving force using electric energy, instead of relying exclusively on engines generating driving force by burning conventional fossil fuels. Among the eco-friendly vehicle technologies using such electric energy, electric vehicles and plug-in hybrid vehicles charge a battery provided therein by receiving power from external charging equipment connected to a grid, and produce kinetic energy needed for driving the vehicles using the power charged in the battery. Accordingly, an eco-friendly vehicle is provided with an on board charger (OBC) that receives a grid power from the external charging equipment and changes the grid power into the power for charging the battery.

The OBC of a vehicle converts an alternating current grid power into direct current power, by which the direct current power is provided to a battery to allow the battery to be charged. On the other hand, terminals of the battery can be connected to a high voltage load such as a vehicle air conditioner and a low-voltage DC-DC converter (LDC) that convert a high voltage to a low voltage.

If the power consumed by the vehicle air conditioner or the low voltage converter is greater than a certain level in a state when the vehicle is being charged using the OBC, the power supplied to the battery decreases, whereby there is a problem in that the charging time becomes excessively long or the battery is not charged to the desired level for a preset time.

In addition, billing is performed on an amount of electric power supplied to the vehicle when charging the vehicle using the external charging equipment, and therefore an excessive amount of electric power is consumed due to the demand of the electric load in addition to the battery charging, thereby increasing a cost burden on the customer.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a method and a system for controlling a vehicle during charging that can address problems in that a charging time is excessively long or a battery is not charged due to a shortage of charging power provided from an on-board charger to the battery caused by power consumption of an electric load during slow charging.

In order to achieve the above object, according to one aspect of the present disclosure, there is provided a method of controlling a vehicle during charging that includes a charger converting external alternating current power into direct current power, and a first battery and an electric load connected to a terminal to which the direct current power converted and output by the charger is applied, the method including: calculating a maximum outputtable power capable of being output by the charger when an operation of the charger is initiated; and calculating a maximum allowable load power capable of being applied to drive the electric load on the basis of the maximum outputtable power, a minimum charging power required to charge the first battery, and a minimum load-requesting power required to operate the electric load.

The method according to an embodiment of the present disclosure may further include: comparing load consumption power currently consumed by the electric load with the maximum allowable load power; and controlling an operation of the electric load so that the load consumption power is equal to or less than the maximum allowable load power when the load consumption power is greater than the maximum allowable load power.

In an embodiment of the present disclosure, the calculating the maximum outputtable power capable of being output by the charger may be performed by calculating the maximum outputtable power capable of being output by the charger, on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

In an embodiment of the present disclosure, the calculating the maximum allowable load power may be performed by determining, as the maximum allowable load power, a value obtained by subtracting the minimum charging power required to charge the first battery and consumption power of a converter connected to the terminal to convert a voltage of the terminal, and then multiplying by charging efficiency of the charger.

In an embodiment of the present disclosure, the controlling the operation of the electric load may be performed by constraining power consumption of a converter that is connected to the terminal to convert a voltage of the terminal or stopping the operation of the electric load connected to an output of the converter when charging power is not supplied to the first battery even after the operation of the electric load is controlled.

In an embodiment of the present disclosure, when constraining the power consumption of the converter, a magnitude of the power consumption constraint may be determined on the basis of a charging state of a second battery charged by the output of the converter.

According to another aspect of the present disclosure, there is provided a system for controlling a vehicle during charging, the system including: a charger converting external alternating current power into direct current power; a first battery and an electric load connected to a terminal to which the direct current power converted and output by the charger is applied; and a controller calculating a maximum outputtable power capable of being output by the charger and calculating a maximum allowable load power capable of being applied to drive the electric load on the basis of the calculated maximum outputtable power, a minimum charging power required to charge the first battery, and a minimum load requiring power required to operate the electric load when an operation of the charger is initiated.

In an embodiment according to the present disclosure, the controller may compare load consumption power consumed by the electric load with the maximum allowable load power, and control an operation of the electric load so that the load consumption power is equal to or less than the maximum allowable load power when the load consumption power is greater than the maximum allowable load power.

In an embodiment according to the present disclosure, the system may further include a converter connected to the terminal and converting the minimum charging power required to charge the first battery and a voltage of the terminal, wherein the controller determines a value obtained by subtracting consumption power of the converter and then multiplying by charging efficiency of the charger as the maximum allowable load power.

In an embodiment according to the present disclosure, the controller may calculate the maximum outputtable power capable of being output by the charger, on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

In an embodiment according to the present disclosure, the controller may be provided to constrain power consumption of the converter or stop an operation of the electric load connected to an output of the converter, when charging power is not supplied to the first battery even after the operation of the electric load is controlled.

In an embodiment according to the present disclosure, the controller may determine a magnitude of the power consumption constraint on the basis of a charging state of a second battery charged by the output of the converter when constraining the power consumption of the converter.

According to another aspect of the present disclosure, there is provided a method of controlling a vehicle during charging that includes a charger converting external alternating current power into direct current power, and a first battery, an air conditioner, and a converter connected to a terminal to which the direct current power converted and output by the charger is applied, the method including: calculating a maximum outputtable power capable of being currently output by the charger when an operation of the charger is initiated; and determining as a maximum allowable air conditioner power capable of being applied to drive the air conditioner, one of a surplus power value produced by subtracting a minimum charging power required to charge the first battery and a consumption power of the converter from the maximum outputtable power and a minimum constraint power required to drive the air conditioner on the basis of an outside temperature of the vehicle.

In an embodiment according to the present disclosure, the method may further include: comparing air conditioner consumption power currently consumed by the air conditioner with the maximum allowable air conditioner power; and controlling an operation of the air conditioner so that the air conditioner consumption power is equal to and less than the maximum allowable air conditioner power when the air conditioner consumption power is greater than the maximum allowable air conditioner power.

In an embodiment according to the present disclosure, the calculating the maximum outputtable power capable of being output by the charger may be performed by calculating the maximum outputtable power capable of being output by the charger, on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

In an embodiment according to the present disclosure, the determining as the maximum allowable air conditioner power may be performed by determining as the surplus power value, a value obtained by subtracting the minimum charging power required to charge the first battery and the converter consumption power from the maximum outputtable power, and then multiplying by charging efficiency of the charger.

In an embodiment according to the present disclosure, the determining as the maximum allowable air conditioner power may be performed by determining a greater value of the surplus power value and the minimum constraint power as the maximum allowable air conditioner power capable of being applied to drive the air conditioner.

In an embodiment according to the present disclosure, the controlling the operation of the air conditioner may be performed by constraining power consumption of the converter or stopping the operation of the air conditioner connected to an output of the converter when charging power is not supplied to the first battery even after the operation of the air conditioner is controlled.

In an embodiment according to the present disclosure, when constraining the power consumption, a magnitude of the power consumption constraint may be determined on the basis of a charging state of a second battery charged by an output of the converter.

According to the method and the system for controlling the vehicle during charging, it is possible to properly control power consumption of a high voltage load such as the air conditioner consuming the charging power output from the OBC when charging the high voltage battery of the vehicle, and thus solve problems in that the charging time increases or the battery fails to be charged due to insufficient charging of the high voltage battery.

Particularly, according to the method and a system for controlling the vehicle during charging, it is possible to prevent power supplied during charging from being unnecessarily consumed by an electric load, thereby saving the charging power and thus reducing a loss in cost and improving satisfaction of the driver.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of the present disclosure will be described in detail with reference to the accompanying drawings. Throughout the drawings, the same reference numerals will refer to the same or like parts.

Figure 1:
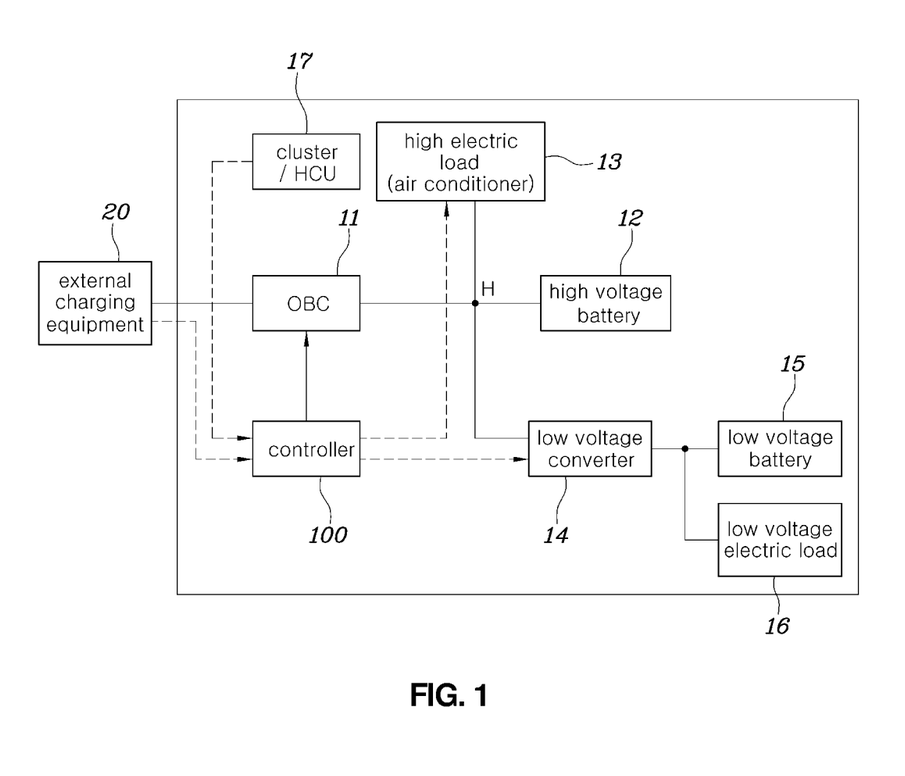
FIG. 1 is a block diagram showing a vehicle control system according to an embodiment of the present disclosure.

FIG. 1 is a block diagram showing a vehicle control system according to an embodiment of the present disclosure.

Referring to FIG. 1, a vehicle control system according to an embodiment of the present disclosure includes an on board charger (hereinafter "OBC") 11 that receives an alternating current power from external charging equipment 20 and converts the alternating current power into direct current power and then outputs the direct current power, a high voltage battery 12 and a high voltage electric load 13 connected to a terminal H to which the direct current power output from the OBC 11 is applied, and a controller 100 for calculating a load power that is capable of being used in the electric load 13 on the basis of a power output by the OBC 11 and a power required by the electric load 13.

The external charging equipment 20 is also referred to as electric vehicle supply equipment (EVSE) and is equipment for providing an alternating current grid power to the vehicle 10. The driver connects a charging outlet prepared in the external charging equipment 20 to a charging inlet in the vehicle and receives the power for charging the high voltage battery 12 of the vehicle from the external charging equipment 20 with billing based on the charging time or the charging amount.

The OBC 11 in the vehicle 10 converts the alternating current power that is a grid power provided by the external charging equipment 20, into direct current power that is capable of charging the high voltage battery 12.

The high voltage battery 12 is an energy storage device connected to a terminal H to which the direct current power converted and output by the OBC 11 is applied so as to be charged with the direct current power converted by the OBC 11.

Here, the terminal H to which the direct current power converted and outputted by the OBC 11 is applied is, as a terminal to which the high voltage system of the vehicle is supplied, connected to not only the high voltage battery 12, but also a high voltage electric load 13 that is operated by being provided with a high voltage corresponding to the voltage of the high voltage battery 12 as a power source voltage and a low voltage DC-DC converter (hereinafter "LDC") for converting the high voltage power into a low voltage power.

Although the high voltage electric load 13 and the LDC 14 are described to be separately distinguished in the description of the disclosure, it may be understood that the LDC 14 is also included in the high voltage electric load 13 in the broadest sense of consuming a high voltage.

The high voltage electric load 13 may be, for example, a vehicle air conditioner. The vehicle air conditioner may raise or lower the vehicle room temperature by operating a heater or a compressor, on the basis of the temperature set by the cluster or a hybrid control unit 17, a temperature actually sensed, and the like.

The LDC 14 is a component that converts the high voltage power applied to a high voltage system into a low voltage power, in which the low voltage power converted by the LDC 14 is used as charging power of the low voltage battery 15 or a power source of the low voltage electric load 16 of the vehicle 10.

The controller 100 may calculate the maximum load power capable of being applied to drive the high voltage electric load 13 on the basis of a power that is outputtable by the OBC 11 currently, charging power required to charge the high voltage battery 12, and a power required to operate the high voltage electric load 13.

The controller 100 may be implemented separately as a controller for controlling the OBC 11 physically, a controller for controlling the high voltage electric load (e.g., air conditioner) 13, and a controller for controlling the LDC 14. In the description of the disclosure, the controller 100 may be understood as a concept encompassing all of the physical controllers capable of being applied to control the vehicle during charging.

The vehicle control system according to various embodiments of the present disclosure having the above configuration may operate in the same manner to the method of controlling the vehicle during charging according to various embodiments of the present disclosure described later.

Figure 2:
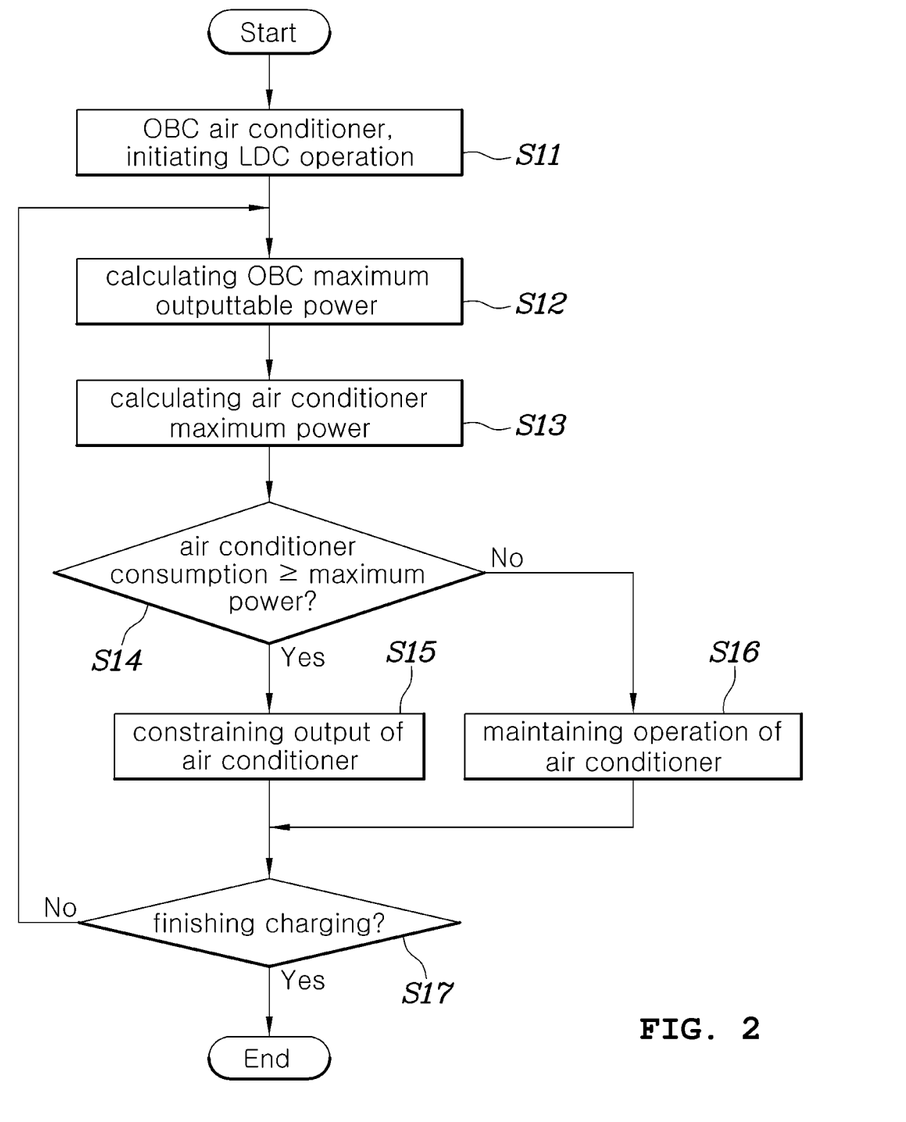
FIG. 2 is a flowchart showing a control process for an on board charger in a method of controlling a vehicle during charging according to an embodiment of the present disclosure.

FIG. 2 is a flowchart showing a control process for an on board charger in a method of controlling a vehicle during charging according to an embodiment of the present disclosure.

Referring to FIG. 2, when an input of initiating slow charging is generated to charge a battery 12 by receiving an alternating current power from external charging equipment 20, a main relay (not shown) connected between a high voltage battery 12 and a vehicle system is turned on to cause the vehicle to be activated, and the controller 100 controls to initiate operations of the OBC 11, and an air conditioner 13 and the LDC 14 of the high voltage electric load (S11).

Then, the controller 100 calculates a magnitude of the maximum power amount capable of being currently output by the OBC 11 in real time (S12). Here, the controller 100 may consider various factors capable of determining the output of the OBC 11.

Figure 3:
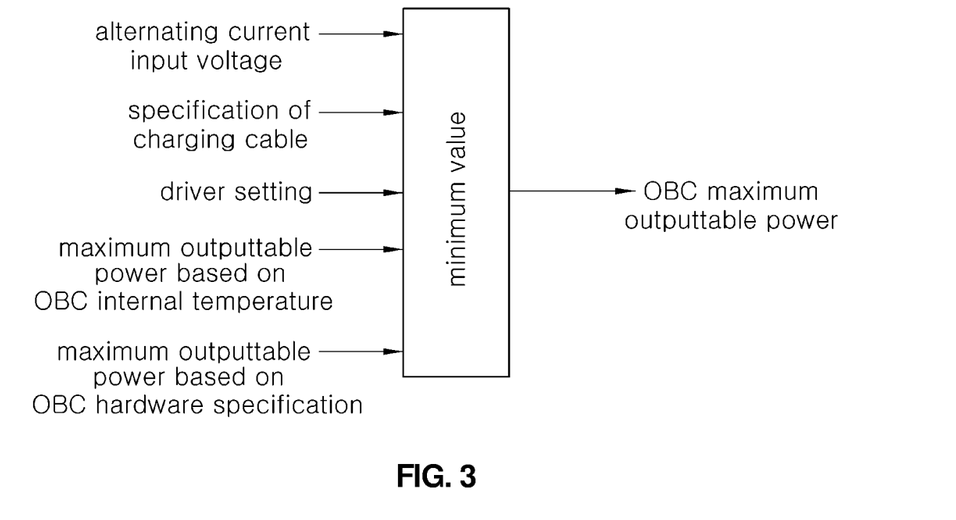
FIG. 3 is a diagram for explaining a process of real-time calculation of a magnitude of the maximum outputtable power capable of being output by an on-board charger in the method of controlling a vehicle during charging according to an embodiment of the present disclosure.

FIG. 3 is a diagram for explaining a process of real-time calculation of a magnitude of the maximum outputtable power capable of being output by an on-board charger in the method of controlling a vehicle during charging according to an embodiment of the present disclosure.

As shown in FIG. 3, in step S12, the controller 100 computes the OBC maximum output power capable of being currently output by the OBC 11 to the maximum, in consideration of the maximum outputtable power of the OBC 11 that is predetermined on the basis of a magnitude of the alternating current voltage input from the external charging equipment 20 to the OBC 11, a specification of a charging cable of a hardware connecting the external charging equipment 20 with the OBC 11, setting of a vehicle driver, and internal temperature of the OBC, and the maximum outputtable power that is based on an OBC hardware specification determined by various components or topologies used when manufacturing the OBC 11. Herein, the driver setting corresponds to a charging time setting input by the driver in the vehicle, and therefore the output of the OBC 11 may be predetermined on the basis of the charging time setting.

In step S12, the OBC power outputs determined by various factors as described above should be satisfied with all factors, and accordingly a minimum value among them may be determined as the OBC maximum outputtable power capable of being currently output at the maximum.

The charging power of the high voltage battery 12, consumption power of the air conditioner 13, and consumption power of the LDC 14 should all be covered within the range of the maximum outputtable OBC power calculated in step S12.

After the maximum outputtable OBC power is calculated, the controller 100 calculates the maximum allowable power capable of being provided to the air conditioner 13 on the basis of the maximum outputtable OBC power (S13).

Figure 4:
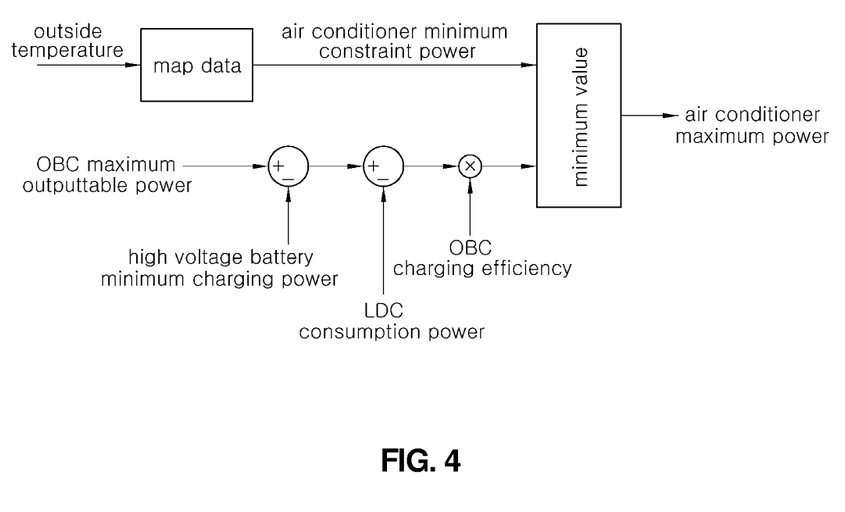
FIG. 4 is a diagram for explaining a process of calculating the maximum load power that is capable of being applied to drive an electric load in the method of controlling a vehicle during charging according to an embodiment of the present disclosure.

FIG. 4 is a diagram for explaining a process of calculating the maximum load power that is capable of being applied to drive an electric load in the method of controlling a vehicle during charging according to an embodiment of the present disclosure.

As shown in FIG. 4, in a step S13, the controller 100 may determine, as the maximum load power capable of being applied to drive the air conditioner 13, a larger value of a value obtained by subtracting a minimum charging power required to charge the high voltage battery 12 and consumption power of the LDC 14 from the maximum outputtable OBC power calculated in S12 and then multiplying by charging efficiency of the OBC 11 predetermined according to a specification of the OBC 11, and a minimum air conditioner constraint power required to drive the air conditioner. Herein, the minimum air conditioner constraint power may be predetermined according to an outside temperature, and derived to correspond to the outside temperature detected on the basis of a predetermined map data.

Herein, the minimum charge power of the high voltage battery 12 may be set to a large value in a mode in which the charging of the high voltage battery 12 is first considered. On the contrary, an output of the map data is set to a large value to cause a minimum power required for the air conditioner to be set to a large value in a mode in which the operation of the air conditioner is first considered.

Then, the controller 100 compares the calculated maximum allowable air conditioner power with the power being currently used in the air conditioner 13 (S14).

The controller 100 may constrain the output of the air conditioner 13 so that the consumption power is equal to or less than the maximum allowable air conditioner power when the power being currently used by the air conditioner 13 is greater than the calculated maximum allowable air conditioner power (S15).

Also, the controller 100 may perform the normal air conditioner control while maintaining a previous output of the air conditioner 13 when the power being currently used in the air conditioner 13 is equal to or less than the calculated maximum allowable air conditioner power.

When the battery is not supplied with sufficient power to charge the high voltage battery 12 even after the output of the air conditioner is constrained in the step S15, it is possible to constrain the power consumption of the LDC 14 or to stop an operation of the low voltage electric load 16 connected to the LDC 14. When the operation of the low voltage electric load 16 is stopped, it is possible to stop an operation from an electric load of a low importance according to the order of importance assigned to each of the low voltage electric loads 16 in advance.

Even after the output of the air conditioner is constrained, if the battery power sufficient to charge the high voltage battery 12 is not supplied to the battery, the air conditioner 13 or the LDC 14 all may be turned off.

Meanwhile, in an embodiment of the present disclosure, in the step S13 of calculating the maximum allowable power capable of being applied to the air conditioner, the controller 100 may induce the maximum allowable power of the LDC 14 as well as the maximum allowable power of the air conditioner. The maximum allowable power of the LDC 14 may be determined according to a charging state of the low voltage battery 15 that is provided by the output of the LDC 14 or an operating state of the low voltage electric load 16. For example, when the charging state of the low voltage battery 15 is low, the low voltage battery 15 should be first charged, whereby the maximum allowable power of the LDC 14 may be determined by the power consumed on the low voltage electric load 16 and the power consumed during charging the low voltage battery 15. When the charging state of the low voltage battery 15 is normal, the maximum allowable power of the LDC 14 may be determined considering only the electric power consumed by the low voltage electric load 16. As another example, when a charging state of the low voltage battery 15 is high and the output of the OBC 11 is insufficient, the maximum allowable power of the LDC 14 is set to a value smaller than the power consumed by the low voltage electric load 16, so that the power charged in an auxiliary battery 15 may be supplied to the low voltage electric load 16.

When the allowable power of the LDC 14 is determined, in step S14, the controller 100 compares the current power consumption of the LDC with the maximum allowable power of the LDC as well as the maximum allowable power of the air conditioner, and constrains the output of the LDC 14 or turns off the low voltage electrical load connected to the LDC 14 so that the current consumption power of the LDC does not exceed the maximum allowable power.

Constraining the output of the LDC 14 is preferably controlled so that a minimum power may be provided to the extent that the charging state is maintained to allow the auxiliary battery 15 not to be reduced to be equal to or less than the predetermined voltage, in consideration of the charging state of the auxiliary battery 15 supplied with the charging power from the LDC 14.

As described above, a method and system for controlling a vehicle during charging according to various embodiments of the present disclosure may properly control power consumption of a high voltage load such as the air conditioner consuming the charging power output from the OBC when charging the high voltage battery of the vehicle, thereby solving problems in that the charging time increases or the battery fails to charge due to insufficient charging power of the high voltage battery.

In particular, it is possible to prevent the power supplied during charging from being unnecessarily consumed by an electric load, thereby saving the charging power and reducing a loss in cost and improving satisfaction of the driver.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling a vehicle during charging in which the vehicle includes a charger converting external alternating current power into direct current power, and a first battery and an electric load connected to a terminal to which the direct current power converted and output by the charger is applied, the method comprising:
   calculating a maximum outputtable power capable of being output by the charger when an operation of the charger is initiated; and
   calculating a maximum allowable load power capable of being applied to drive the electric load on the basis of the maximum outputtable power, a minimum charging power required to charge the first battery, and a minimum load-requesting power required to operate the electric load.

2. The method of claim 1, further comprising:
   comparing a load consumption power currently consumed by the electric load with the maximum allowable load power; and
   controlling an operation of the electric load so that the load consumption power is equal to or less than the maximum allowable load power when the load consumption power is greater than the maximum allowable load power.

3. The method of claim 2, wherein controlling the operation of the electric load is performed by constraining power consumption of a converter that is connected to the terminal to convert a voltage of the terminal or stopping the operation of the electric load connected to an output of the converter when charging power is not supplied to the first battery even after the operation of the electric load is controlled.

4. The method of claim 3, wherein, when constraining the power consumption of the converter, a magnitude of the power consumption constraint is determined on the basis of a charging state of a second battery charged by the output of the converter.

5. The method of claim 1, wherein calculating the maximum outputtable power capable of being output by the charger is performed on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

6. The method of claim 1, wherein calculating the maximum allowable load power is performed by determining, as the maximum allowable load power, a value obtained by subtracting the minimum charging power required to charge the first battery and a consumption power of a converter connected to the terminal to convert a voltage of the terminal, and then multiplying by charging efficiency of the charger.

7. A system for controlling a vehicle during charging, the system comprising:
   a charger converting external alternating current power into direct current power;
   a first battery and an electric load connected to a terminal to which the direct current power converted and output by the charger is applied; and
   a controller calculating maximum outputtable power capable of being output by the charger and calculating a maximum allowable load power capable of being applied to drive the electric load on the basis of the calculated maximum outputtable power, a minimum charging power required to charge the first battery, and a minimum load requiring power required to operate the electric load when an operation of the charger is initiated.

8. The system of claim 7, wherein the controller compares load consumption power consumed by the electric load with the maximum allowable load power, and controls an operation of the electric load so that the load consumption power is equal to or less than the maximum allowable load power when the load consumption power is greater than the maximum allowable load power.

9. The system of claim 7, further comprising a converter connected to the terminal and converting the minimum charging power required to charge the first battery and a voltage of the terminal,
wherein the controller determines a value obtained by subtracting consumption power of the converter and then multiplying by charging efficiency of the charger as the maximum allowable load power.

10. The system of claim 9, wherein the controller is provided to constrain power consumption of the converter or stop an operation of the electric load connected to an output of the converter, when charging power is not supplied to the first battery even after the operation of the electric load is controlled.

11. The system of claim 10, wherein the controller determines a magnitude of the power consumption constraint on the basis of a charging state of a second battery charged by the output of the converter when constraining the power consumption of the converter.

12. The system of claim 7, wherein the controller calculates the maximum outputtable power capable of being output by the charger, on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

13. A method of controlling a vehicle during charging in which the vehicle includes a charger converting external alternating current power into direct current power, and a first battery, an air conditioner, and a converter connected to a terminal to which the direct current power converted and output by the charger is applied, the method comprising:
calculating a maximum outputtable power capable of being currently output by the charger when an operation of the charger is initiated; and
determining as a maximum allowable air conditioner power capable of being applied to drive the air conditioner, one of a surplus power value produced by subtracting a minimum charging power required to charge the first battery and a consumption power of the converter from the maximum outputtable power and a minimum constraint power required to drive the air conditioner on the basis of an outside temperature of the vehicle.

14. The method of claim 13, further comprising:
comparing an air conditioner consumption power currently consumed with the maximum allowable air conditioner power; and
controlling an operation of the air conditioner so that the air conditioner consumption power is equal to and less than the maximum allowable air conditioner power when the air conditioner consumption power is greater than the maximum allowable air conditioner power.

15. The method of claim 14, wherein the controlling the operation of the air conditioner is performed by constraining power consumption of the converter or stopping the operation of the air conditioner connected to an output of the converter when charging power is not supplied to the first battery even after the operation of the air conditioner is controlled.

16. The method of claim 13, wherein determining as the maximum allowable air conditioner power is performed by determining as the surplus power value, a value obtained by subtracting the minimum charging power required to charge the first battery and the converter consumption power from the maximum outputtable power, and then multiplying by charging efficiency of the charger.

17. The method of claim 16, wherein the determining as the maximum allowable air conditioner power is performed by determining a greater value of the surplus power value and the minimum constraint power.

18. The method of claim 17, wherein, when constraining the power consumption, a magnitude of the power consumption constraint is determined on the basis of a charging state of a second battery charged by an output of the converter.

19. The method of claim 13, wherein calculating the maximum outputtable power capable of being output by the charger is performed on the basis of at least a portion of the maximum outputtable power predetermined based on a magnitude of an alternating current voltage input to the charger, a specification of a charging cable of a hardware connecting external charging equipment providing the external alternating current power with the charger, a user setting, and an internal temperature of the charger, and the maximum outputtable power based on a hardware specification determined when manufacturing the charger.

20. The method of claim 13, wherein the determining as the maximum allowable air conditioner power is performed by determining a greater value of the surplus power value and the minimum constraint power.

* * * * *